United States Patent
Young

(10) Patent No.: US 7,610,493 B2
(45) Date of Patent: Oct. 27, 2009

(54) SYSTEM AND METHODS FOR ADAPTING TO ATTACKS ON CRYPTOGRAPHIC PROCESSES ON MULTIPROCESSOR SYSTEMS WITH SHARED CACHE

(75) Inventor: David Walter Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 11/216,487

(22) Filed: Aug. 31, 2005

(65) Prior Publication Data

US 2007/0067840 A1      Mar. 22, 2007

(51) Int. Cl.
*H04L 9/32* (2006.01)
(52) U.S. Cl. .................. 713/189; 713/192; 713/193
(58) Field of Classification Search ......... 713/189–190, 713/192–194; 726/22; 711/100, 113, 118–123, 711/130

See application file for complete search history.

(56) References Cited

U.S. PATENT DOCUMENTS 7,454,016 B2 *  11/2008  Tsunoo ................. 380/29

OTHER PUBLICATIONS

Percival, Colin, "Cache Missing for Fun and Profit", *Proc. of BSDCan 2005*, http://www.daemonology.net/papers/cachemissing.pdf, (2005), 1-13.

* cited by examiner

*Primary Examiner*—Hosuk Song
(74) *Attorney, Agent, or Firm*—Schwegman, Lundberg & Woessner, P.A.; Gregory J. Gorrie

(57) ABSTRACT

Embodiments of system and method for adapting to attacks of cryptographic processes on multiprocessor systems with shared cache are generally described herein. Other embodiments may be described and claimed.

30 Claims, 1 Drawing Sheet

PROCESSING SYSTEM

PROCESSING SYSTEM

SYSTEM AND METHODS FOR ADAPTING TO ATTACKS ON CRYPTOGRAPHIC PROCESSES ON MULTIPROCESSOR SYSTEMS WITH SHARED CACHE

TECHNICAL FIELD

Some embodiments of the present invention pertain to multiprocessor systems with shared cache. Some embodiments of the present invention pertain to processing systems that perform cryptographic operations. Some embodiments of the present invention pertain to processing systems that perform hyperthreading.

BACKGROUND

Some processing systems may concurrently execute two independent processing threads. One problem with these systems is that a malicious thread or process may be able to gather information about another thread or process. For example, when a cryptographic process is using a secret key, a malicious process may able to determine the bits of the key by monitoring certain operations performed by the cryptographic process.

Thus, there are general needs for processing systems and methods that can adapt to attacks by malicious processes. There are also general needs for processing systems and methods that can efficiently perform cryptographic processes and adapt to attacks on these cryptographic processes. There are also general needs for processing systems and methods that can securely perform cryptographic processes in the presence of an attack by a malicious process.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
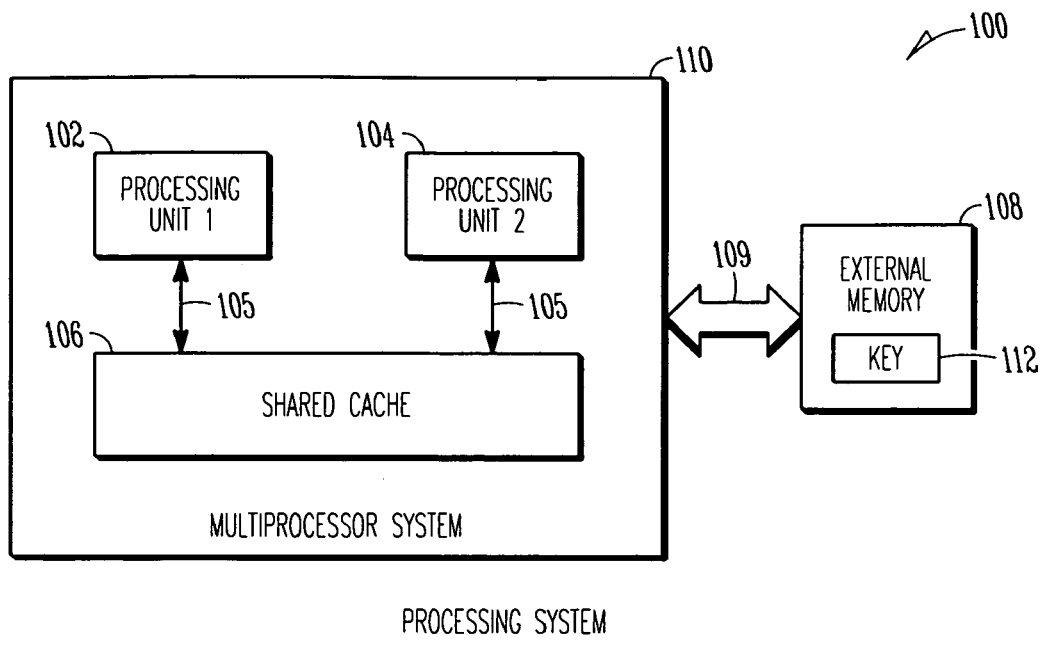
FIG. 1 is a functional block diagram of a processing system in accordance with some embodiments of the present invention.

FIG. 1 is a functional block diagram of a processing system in accordance with some embodiments of the present invention. Processing system 100 includes multiprocessor system 110 and external memory 108. Multiprocessor system 110 may include two or more processing units, such as processing units 102 and 104, and cache 106. In accordance with some embodiments of the present invention, processing system 100 may implement hyperthreading in which processing units 102 and 104 may each execute one or more independent processing threads. Cache 106 may be shared by both processing units 102 and 104 and may be coupled to processing units 102 and 104 by internal data busses 105. Cache 106 may include both level 1 (L1) (i.e., primary) and level 2 (L2) (i.e., secondary) cache. External memory 108 may be the main memory and may be coupled to multiprocessor system 110 by memory bus 109. Processing system 100 may also include one or more internal or external memory controllers for interfacing with external memory 108, as well as other functional elements that are not illustrated for clarity. The elements of multiprocessor system 110 may be part of single chip or semiconductor device and may include several semiconductor die within a single integrated circuit (IC) package that may include multiprocessor system 110, although the scope of the invention is not limited in this respect.

In accordance with some embodiments of the present invention, processing system 100 may perform cryptographic processes that may use cryptographic key 112, which may be stored in a secure manner in memory 108. Examples of cryptographic processes include encryption, decryption, signing and verifying, and may depend on the nature of key 112. In some embodiments, key 112 may be stored in memory 108 in an encrypted or secure form and may be decrypted prior to use by one of the processing units, although the scope of the invention is not limited in this respect.

In accordance with some embodiments, processing system 100 may adapt to attacks on cryptographic processing operations. An example of an attack on a cryptographic process is a shared-cache attack. In this type of attack, a malicious or spy process operating on processing unit 104, for example, may evict data in shared cache 106 that is being used by a cryptographic process operating on processing unit 102. The cryptographic process may often have to reload this evicted data from external memory 108 back to shared cache 106. The malicious process may monitor the pattern of delays (e.g., cache invalidate patterns) of the cryptographic process caused by reloading the evicted data to determine the value of cryptographic key 112. Examples of this are described in more detail below.

Some conventional techniques may even out cache usage on infected as well as non-infected systems to help prevent a malicious process from gaining information from cache reloading. These conventional techniques result in reduced performance, which is undesirable especially on systems that do not have malicious processes operating thereon.

In accordance with some embodiments of the present invention, processing system 100 may adapt to shared-cache attacks on cryptographic processing operations by monitoring the number of cache misses that occur during the performance of cryptographic operations. In some of these embodiments, processing system 100 may switch to performing safer cryptographic operations after the number of cache misses exceeds a threshold or frequency. A high rate of cache misses may indicate the presence of a malicious thread that has evicted data from shared cache 106. Cryptographic processing may be enhanced for systems that are believed to be free of such malicious processes (e.g., while the number cache misses remain below a threshold or frequency). Furthermore, cryptographic processing may be more secure when a malicious process is believed to be present (e.g., after the number cache misses exceed a threshold or frequency). These embodiments are described in more detail below.

In accordance with some embodiments, cache 106 may be arranged in sets. In some embodiments, cache 106 may include 128 cache lines arranged in 32 sets, although the scope of the invention is not limited in this respect. A malicious process, for example, may continually cycle through the array and may fill up cache 106, reading and measuring the time needed to access each set. If the cryptographic process has previously accessed something from the set, then the information stored by the malicious process would have been evicted from that set of cache 106 and the time to access the information from that set by the malicious process will be greater, because it not has to be accessed from external memory 108. From this increased access time, a malicious process operating on one processing unit may be able to identify the portion of cache 106 being used by a cryptographic process operating on another processing unit of the system.

In an example in which the cryptographic processing operations include Rivest-Shamir-Adleman (RSA) cryptographic processing operations, the cache access patterns of the cryptographic process may be dependent upon the RSA private key. In RSA cryptography, the RSA private key is an exponent. When a private key exponent bit is 0 or 1, the cryptographic process performs a squaring operation. When the private key exponent bit is a 1, a multiply operation is also performed. The squaring operation sets a current value to the square of the current value. The multiplying operation sets the current value to the current value times a base value. The base value may be a message or other piece of information that is to be decrypted. The current value may be a running value that may initially start as the base value and eventually may become, for example, the decrypted message. The base value may initially be loaded from external memory 108 to cache 106 at the initiation of the cryptographic processes. As can be seen, the base value does not need to be accessed from cache 106 when the private key exponent bit is 0, and does need to be accessed when the private key exponent bit is a 1. This different access pattern for the different exponent bits of an encryption key can leak the value of the key. For example, a malicious process may evict the base value from cache 106 so that when the base value is accessed, the base value will need to be reloaded from external memory 108. The malicious process may note the added delay and can chalk up a binary '1' for the exponent of the private key bit. When no delay exists, the malicious process may chalk up a '0' for the exponent of the private key bit.

To help reduce these cache invalidate patterns and patterns associated with performing the multiply operation, some conventional RSA implementations create pre-calculated small exponent tables for the base value (i.e., BASE), so that the values of $BASE^1$, $BASE^2$, etc., are pre-stored in cache 106 or memory 108. In these implementations, the multiply operation is performed for both ones and zeros of the cryptographic key, which results in a performance reduction that may be partially mitigated by the use of the pre-calculations.

Some other conventional RSA implementations use larger-sized windows with, for example, 5-bit small-exponent values, which may increase efficiency. These implementations generally skip the multiply operation for a zero exponent bit, especially in sliding windows techniques, and as a result, the number of zeroes in the cryptographic key exponents may easily be determined by the malicious process. Furthermore, the patterns in the use of the 5-bit small exponent values may also allow a malicious process to determine bits of the private key exponent, especially when pre-calculated values force cache set reloads in distinguishable patterns.

In accordance with some embodiments of the present invention, processing system 100 may, as part of its cryptographic processing operations, monitor a number of cache misses that occur during the performance of a first cryptographic process, and may perform a second cryptographic process after the number of cache misses exceeds a threshold. The first cryptographic process, for example, may be a faster or more efficient process. The second cryptograph process, for example, may be a safer or less efficient process. A safer cryptographic process may reduce the chances that a malicious process may be able to determine the value of an encryption key and may be a slower process, although the scope of the invention is not limited in this respect. In this way, a processing system without a known malicious process may run faster and does not have to run less efficiently, while a system that is believed to have a malicious process may run more safely, although possibly slower. In some embodiments, the threshold may be a frequency or rate at which the cache misses occur, although the scope of the invention is not limited in this respect.

In some embodiments, the present invention provides methods for adapting to responding to an attack on cryptographic key calculations in systems that performs hyperthreading. In some embodiments, the present invention provides methods for adapting to responding to an attack on cryptographic key calculations in multiprocessor systems. The term cryptographic key, as used herein, may refer to keys used for encryption and decryption as well as keys used for other cryptographic operations. In some embodiments, the term cryptographic key may refer to a symmetric key, while in other embodiments; the term cryptographic key may refer to a non-symmetric key such as a private key.

In some embodiments, the first cryptographic process may include performing first operations for first values (e.g., the ones) of a cryptographic key and performing second operations for second values (e.g., zeroes) of the cryptographic key. Performing the first operations may include attempting to access information, such as a base value, from cache 106. During a cache miss, the information may be reloaded from external memory 108 to cache 106. In these embodiments, the second operations do not use require access to the information from cache 106.

In some embodiments, a malicious process may attempt to determine the value of the cryptographic key by evicting the base value from cache 106 and by measuring an added delay when the base value is reloaded to cache 106 by the first cryptographic process. In some embodiments, the malicious process may be a spy process, malicious thread or virus, or may be some other undesired, unknown or Trojan process.

In some embodiments, the first (e.g., faster) and the second (e.g., slower) cryptographic processes may both operate on first processing unit 102, the malicious process may operate on second processing unit 104, and cache 106 may be shared by both first and second processing units 102 & 104. In some embodiments, first and second processing units 102 & 104 and shared cache 106 may part of single multiprocessor system 110. Memory 108 may be external to multiprocessor system 110. In some embodiments, cache 106 may be a L2 cache shared by both processing units 102 & 104, although the scope of the invention is not limited in this respect. In some embodiments, cache 106 may be a L1 cache shared by both processing units 102 & 104, although the scope of the invention is not limited in this respect.

In some single processor embodiments, first and second processing units 102 & 104 may be first and second virtual processing units, respectively, and may comprise a single processor. In these embodiments, the single processor may perform hyperthreading in which the first and second virtual processing units may run a corresponding two or more separate instruction pipelines. In these single processor embodiments, a cryptographic process may run on the first virtual processing unit and a malicious process may run on the second virtual processing units.

In some embodiments, the first operations discussed above performed by the first (e.g., faster) cryptographic process may include squaring a running value and multiplying the result by the base value for ones of the cryptographic key. In these embodiments, the second operations discussed above performed by the first (e.g., faster) cryptographic process may include squaring the running value for zeroes of the cryptographic key without using or accessing the base value from either cache 106 or memory 108 for zeros of the cryptographic key. In some embodiments, the cryptographic key may be a private key and may be an exponent in which the private key exponent bit is either a zero or a one, although the scope of the invention is not limited in this respect.

In some embodiments, the second (e.g., safer) cryptographic process may include accessing the base value from either cache 106 or if not in cache, then from memory 108, for both zeros and ones of the cryptographic key. The second cryptographic process may also include performing a multiplication operation for both zeros and ones of the cryptographic key. The multiplication operation for the zeros may include a multiplication by a zero exponent (i.e., a multiplication by one). In these embodiments, when the private key exponent bit is a zero, the base value may also be accessed. As can be seen, in these embodiments, the second (e.g., safer) cryptographic process performs multiplication operations and cache access for both ones and zeros of the cryptographic key, making it difficult, if not impossible, for the malicious process to determine the value of the key from cache invalidation patterns.

In some embodiments, both the first and second cryptographic processes may include either a decryption or signing digital signature operation that uses non-symmetric keys (e.g., private-public key pairs used in the RSA cryptographic process), although the scope of the invention is not limited in this respect. In these embodiments, the cryptographic key may be a private key of a public-private key pair for use in either signing or decrypting. In these embodiments, the base value may be a message or other data to be either decrypted or signed by the private key. The running value may eventually become either the decrypted or the signed message and may be the output of the decryption or signing operation. In some of these embodiments, the first and second cryptographic processes may implement the RSA cryptographic process, although the scope of the invention is not limited in this respect.

In some alternate embodiments, the first and second cryptographic processes may include either an encryption or decryption operation using a symmetric cryptographic key. In these embodiments, the base value may be a message to be either encrypted or decrypted by the symmetric key. In some of these alternate embodiments, the first and second cryptographic processes implement either the advanced encryption standard (AES) or the data encryption standard (DES), although the scope of the invention is not limited in this respect.

In some embodiments, processing system 100 may determine or estimate the number of cache misses by monitoring the number of cache evictions. In these embodiments, processing system 100 may identify lines of cache 106 that contain, for example, the base value, and may monitor the total number cache evictions in these identified cache lines or within an identified cache address range. In these embodiments, an interrupt may be initiated when the total number of cache evictions exceeds a threshold or frequency. Some embodiments may be thread specific and may allow the number of cache misses to be monitored for a specific processing thread, although the scope of the invention is not limited in this respect.

In some other embodiments, processing system 100 may measure the delay associated with performing the first operations (e.g., the multiply operation) on the first values (e.g., the ones) of a cryptographic key. In these embodiments, an increased delay may indicate that the base value has been evicted from cache 106 and is being reloaded. In these embodiments, the delay may be compared to the delay associated with performing the first operations on the first values (i.e., the ones) of the cryptographic key immediately after the base value is initially loaded into cache 108. In these embodiments, a second (e.g., safer) cryptographic process may be performed after the delay exceeds a predetermined value, although the scope of the invention is not limited in this respect.

In some embodiments, processing system 100 may initiate a process to remove the malicious process from a processing unit after the number of cache misses exceeds the threshold, although the scope of the invention is not limited in this respect. In some embodiments, instead of or in addition to switching from a first (e.g., faster) cryptographic process to a second (e.g., safer) cryptographic process, processing system 100 may perform error logging, may notify an administrator that a malicious process may be operating on a processing unit, may terminate all cryptographic processing and/or may shut down the system, although the scope of the invention is not limited in this respect.

Some embodiments of the present invention may be implemented within cryptographic toolkits, and some embodiments may be implemented as part of stand-alone cryptographic software, although the scope of the invention is not limited in this respect. In some embodiments, processing system 100 may reside in a server or may be part of a server. In other embodiments, processing system 100 may reside in or be part of a personal computing device or laptop computer. In some embodiments, processing system 100 may reside in or be part of a wireless communication device, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly. In some embodiments, processing system 100 may be a wireless device that may communicate by either spread spectrum or orthogonal frequency division multiplexed (OFDM) communication signals and may be part of a communication station (STA), a wireless access point (AP), such as a Wireless Fidelity (WiFi), a Worldwide Interoperability for Microwave Access (WiMax), or a broadband communication station, although the scope of the invention is not limited in this respect.

In some embodiments, the first (e.g., faster) cryptographic process may include accessing information from cache for either ones or zeros of a cryptographic key 112, but not for both the ones and the zeros of the cryptographic key. In these embodiments, the second (e.g., safer) cryptographic process may include accessing information from cache for both the ones and the zeros of the cryptographic key.

In some embodiments, an event counting technique may be used to profile software performance in real-time. This event counting technique may allow operating parameters to be set up so that once in every programmable number of cache evictions, an exception is made within the monitored thread to a piece of code in that thread which logs the cache eviction event. In some embodiments of the present invention, a monitored thread may see that a cache event occurred by observing its own event log during cryptographic processing operations. In these embodiments, when the observed frequency of cache misses is significantly greater than the system's historical experience or crosses a pre-determined threshold or frequency, the current cryptographic process or calculation may be aborted and may be restarted using a different (e.g., safer) cryptographic process, such as the second cryptographic process described above, although the scope of the invention is not limited in this respect. The presence of a possible cache eviction attack against the cryptographic process may be noted and the malicious process may remain in processing system 100 until, for example, the system is reset or a virus removal process is performed, although the scope of the invention is not limited in this respect. In some embodiments, a notation noting the presence of a malicious process may be made in the operating system's event log, although the scope of the invention is not limited in this respect.

Cache 106 may be almost any type of random access memory (RAM), and in some embodiments, cache 106 may include static RAM (SRAM), although the scope of the invention is not limited in this respect. Memory 108 may be almost any type of data storage element including, dynamic RAM (DRAM) or magnetic RAM (MRAM), although the scope of the invention is not limited in this respect. Processing units 102 and 104 may include microprocessors, processing engines and other semiconductor devices that process instructions.

Although processing system 100 is illustrated as having several separate functional elements, one or more of the functional elements may be combined and may be implemented by combinations of software-configured elements, such as processing elements including digital signal processors (DSPs), and/or other hardware elements. For example, some elements may include one or more microprocessors, DSPs, application specific integrated circuits (ASICs), and combinations of various hardware and logic circuitry for performing at least the functions described herein.

Figure 2:
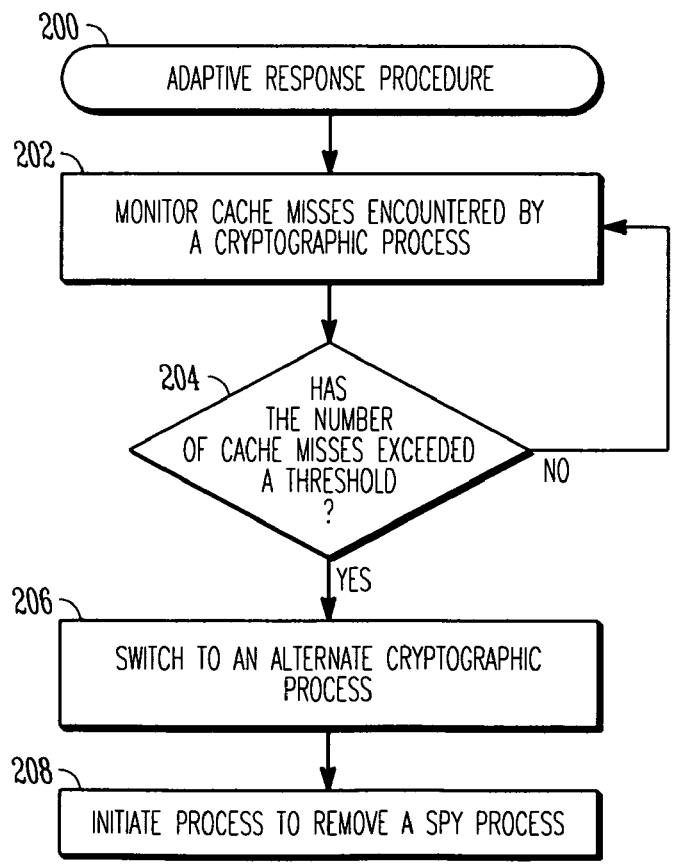
FIG. 2 is a flow chart of an adaptive response procedure in accordance with some embodiments of the present invention.

FIG. 2 is a flow chart of an adaptive response procedure in accordance with some embodiments of the present invention. Adaptive response procedure 200 may be performed by a processing system, such as processing system 100. In some embodiments, adaptive response procedure 200 may be performed as part of or alongside with cryptographic processing operations performed by one of the processing units of system 100.

Operation 202 monitors the number of cache misses that occur during the performance of a cryptographic process operating on one of the processing units, such as processing unit 102. Operation 202 may monitor the number of cache misses in several ways, including measuring the number of cache evictions and/or measuring increased time to perform certain processing operations as described above.

Operation 204 determines when the number of cache misses exceeds a threshold or frequency. Procedure 200 may continue to perform the cryptographic process during operation 202 while the number of cache misses remains below the threshold. After the number of cache misses exceeds a threshold, operation 206 is performed. In some alternate embodiments, operation 204 may determine when a number cache evictions exceed a threshold or frequency, or when an increased time to perform certain processing operations exceeds a threshold, depending on what operation 202 monitors.

In some embodiments, in operation 206, the cryptographic process may be aborted and the processing unit may switch to a second (e.g., safer) cryptographic process. Alternatively, the system may be shut down or all cryptographic processing may be terminated, although the scope of the invention is not limited in this respect.

Operation 208 may initiate a process to remove a malicious process Operation 208 may be performed based on the belief that a malicious process is operating on the second processing unit based on the number of cache misses monitored in operation 202. In some embodiments, operation 208 may be optional.

Although the individual operations of procedures 200 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method for operating a multiprocessor processing system having first and second processing units and a cache that is shared by both the first and second processing units, the method comprising:
   monitoring a number of cache misses on the shared cache that occur during the performance of a first cryptographic process by the first processing unit; and
   switching to performing a second cryptographic process by the first processing unit after the number of cache misses exceeds a threshold.

2. The method of claim 1 wherein the first cryptographic process comprises accessing information from cache for either ones or zeros of a cryptographic key, but not for both the ones and the zeros of the cryptographic key, and wherein the second cryptographic process comprises accessing the information from cache for both the ones and the zeros of the cryptographic key.

3. The method of claim 1 wherein the first cryptographic process comprises performing first operations for first values of a cryptographic key and second operations for second values of the cryptographic key, wherein performing the first operations comprises accessing a base value from cache, wherein during a cache miss, the method comprises reloading the base value from memory to the cache, and wherein the second operations do not require access to the base value from the cache.

4. The method of claim 3 wherein a malicious process attempts to determine the value of the cryptographic key by evicting the base value from the cache and by measuring an added delay when the base value is reloaded to the cache by the first cryptographic process.

5. The method of claim 4, wherein the malicious process operates on the second processing unit, and wherein the method further comprises:

operating the first and the second cryptographic processes on a first processing unit; and sharing the cache by both the first and the second processing units.

6. The method of claim 5 wherein the first and second processing units and the shared cache are part of the multiprocessor processing system and are within a single integrated circuit package, wherein the memory is external to the single integrated circuit package, and wherein the method further comprises performs hyperthreading by the multiprocessor processing system in which each of the processing units independently executes one or more different processing threads.

7. The method of claim 4 wherein the processing system is a single processor processing system comprising first and second virtual processing units, wherein the malicious process operates on the second virtual processing unit, wherein the first and second virtual processing units and the shared cache are within a single integrated circuit package, wherein the memory is external to the single integrated circuit package, and wherein the method further comprises:

operating the first and the second cryptographic processes on the first virtual processing unit;

sharing the cache by both the first and the second virtual processing units; and performing hyperthreading within the single processor processing system in which each of the virtual processing units independently executes one or more different processing threads.

8. The method of claim 3 wherein the first operations comprise squaring a running value and multiplying by the base value for ones of the cryptographic key, wherein the second operations comprise squaring the running value for zeroes of the cryptographic key without accessing the base value from cache, and wherein the second cryptographic process comprises:

accessing the base value for both zeros and ones of the cryptographic key; and performing a multiplication operation for both zeros and ones of the cryptographic key, wherein the multiplication operation for the zeros comprises a multiplication by one.

9. The method of claim 3 wherein the first and second cryptographic processes comprise either a decryption or signing operation that uses non-symmetric keys, wherein the cryptographic key is a private key of a public-private key pair for use in either the signing or decrypting operations, and wherein the base value is a message to be either decrypted or signed by the private key.

10. The method of claim 3 wherein the first and second cryptographic processes comprise either an encryption or decryption operation using a symmetric cryptographic key, and wherein the base value is a message to be either encrypted or decrypted by the symmetric key.

11. The method of claim 5 further comprising:

continuing to perform the first cryptographic process while the number of cache misses remains below the threshold;

aborting the first cryptographic process after the number of cache misses exceed the threshold; and switching to the second cryptographic process after the number of cache misses exceeds the threshold.

12. The method of claim 5 further comprising identifying lines of the cache that contain the base value, wherein monitoring the number of cache misses comprises monitoring a total number cache evictions in the identified cache lines, and wherein the method further comprises initiating an interrupt when a total number of cache evictions exceed a threshold.

13. The method of claim 5 wherein monitoring the number of cache misses comprises measuring a delay associated with performing the first operations on the first values of the cryptographic key, and wherein the second cryptographic process is performed after the delay exceeds a predetermined value.

14. The method of claim 5 further comprising initiating a process to remove the malicious process on the second processing unit after the number of cache misses exceed the threshold.

15. A multiprocessor processing system comprising:

first and second processing units; and a cache shared by the first and second processing units, the first processing unit to monitor a number of cache misses on the shared cache that occur during the performance of a first cryptographic process by the first processing unit and to switch to performing a second cryptographic process by the first processing unit after the number of cache misses exceeds a threshold.

16. The system of claim 15 wherein, as part of the first cryptographic process, the first processing unit accesses information from the cache for either ones or zeros of a cryptographic key, but not both the ones and the zeros of the cryptographic key, wherein as part of the second cryptographic process, the first processing unit accesses the information from cache for both the ones and the zeros of the cryptographic key, and wherein a non-cryptographic process operating on the second processing unit evicts information used by the first cryptographic process from the cache.

17. The system of claim 15 wherein the first processing unit performs, as part of the first cryptographic process, first operations for first values of a cryptographic key and performs second operations for second values of the cryptographic key, wherein during the performance of the first operations, the
first processing unit accesses a base value from cache,
wherein during a cache miss, the first processing unit
reloads the base value from an external memory to the
cache, and
wherein during the performance of the second operations,
the first processing unit does not access the base value
from the cache.

18. The system of claim 17 wherein a non-cryptographic process operating on the second processing unit is a malicious process that attempts to determine the value of the cryptographic key by evicting the base value from the cache and by measuring an added delay when the base value is reloaded to the cache by the first cryptographic process.

19. The system of claim 17 wherein the first processing unit performs the first operations by squaring a running value and by multiplying by the base value for ones of the cryptographic key,
wherein the first processing unit performs the second operations by squaring the running value for zeroes of the cryptographic key without using or accessing the base value for zeros of the cryptographic key,
wherein during the second cryptographic process performed by the first processing unit, the base value is accessed for both zeros and ones of the cryptographic key and a multiplication operation is performed for both zeros and ones of the cryptographic key,
wherein the multiplication operation for the zeros comprises a multiplication by one.

20. The system of claim 17 wherein the first and second cryptographic processes comprise either a decryption or signing operation that uses non-symmetric keys,
wherein the cryptographic key is a private key of a public-private key pair for use in either signing or decrypting, and
wherein the base value is a message to be either decrypted or signed by the private key.

21. The system of claim 17 wherein the first and second cryptographic processes comprise either an encryption or decryption operation using a symmetric cryptographic key, and
wherein the base value is a message to be either encrypted or decrypted by the symmetric key.

22. The system of claim 17 wherein the first and second processing units comprise separate physical processing units of a multiprocessor processing system,
wherein the first and second processing units and the shared cache are within a single integrated circuit package,
wherein the memory is external to the single integrated circuit package, and
wherein the multiprocessor processing system performs hyperthreading in which each of the processing units independently executes different processing threads.

23. The system of claim 17 wherein the first and second processing units comprise a single physical processor of a single-processor processing system,
wherein the first processing unit is a first virtual processing unit,
wherein the second processing unit is a second virtual processing unit,
wherein the first and the second cryptographic processes operate on the first virtual processing unit,
wherein the malicious process operates on the second virtual processing unit,
wherein the cache is shared by both the first and the second virtual processing units,
wherein the first and second virtual processing units and the shared cache are within a single integrated circuit package,
wherein the memory is external to the single integrated circuit package, and
wherein the single processor processing system performs hyperthreading in which each of the virtual processing units independently executes one or more different processing threads.

24. The system of claim 23 wherein the system is part of a wireless communication device that communicates either spread spectrum or orthogonal frequency division multiplexed communication signals.

25. A system comprising:
external memory comprising dynamic random access memory (DRAM) to store information used by first and second cryptographic processes; and
a multiprocessor system comprising first and second processing units and a cache shared by the first and second processing units, the first processing unit to monitor a number of cache misses on the shared cache that occur during the performance of the first cryptographic process and to switch to performing the second cryptographic process by the first processing unit after the number of cache misses exceed a threshold.

26. The system of claim 25 wherein, as part of the first cryptographic process, the first processing unit accesses information from the cache for either ones or zeros of a cryptographic key, but not both the ones and the zeros of the cryptographic key,
wherein as part of the second cryptographic process, the first processing unit accesses the information from cache for both the ones and the zeros of the cryptographic key, and
wherein a non-cryptographic process operating on the second processing unit evicts information used by the first cryptographic process from the cache.

27. The system of claim 25 wherein the first processing unit performs, as part of the first cryptographic process, first operations for first values of a cryptographic key and performs second operations for second values of the cryptographic key,
wherein during the performance of the first operations, the first processing unit accesses a base value from cache,
wherein during a cache miss, the first processing unit reloads the base value from the external memory to the cache, and
wherein during the performance of the second operations, the first processing unit does not access the base value from the cache.

28. A computer-readable storage medium that stores instructions for execution by a first processing unit or a multiprocessor system comprising the first processing unit and a second processing units and a cache that is shared by both the first and second processing units, the instructions configuring the first processing unit to perform operations comprising:
monitoring a number of cache misses on the shared cache that occur during the performance of a first cryptographic process by the first processing unit; and
switching to performing a second cryptographic process by the first processing unit after the number of cache misses exceeds a threshold.

29. The computer-readable storage medium of claim 28 wherein the first cryptographic process accesses information from cache for either ones or zeros of a cryptographic key, but not for both the ones and the zeros of the cryptographic key, and wherein the second cryptographic process accesses the information from cache for both the ones and the zeros of the cryptographic key.

30. The computer-readable storage medium of claim 28 wherein the first cryptographic process performs first operations for first values of a cryptographic key and second operations for second values of the cryptographic key, wherein the first operations accesses a base value from cache, wherein during a cache miss, the base value is reloaded from memory to the cache, and wherein the second operations do not access to the base value from the cache.

* * * * *